United States Patent [19]

Saito et al.

[11] Patent Number: 4,695,894
[45] Date of Patent: Sep. 22, 1987

[54] EXPOSURE CONTROL APPARATUS

[75] Inventors: Syuichiro Saito, Kanagawa; Tadashi Okino, Tokyo, both of Japan

[73] Assignee: Canon Kabushiki Kaisha, Japan

[21] Appl. No.: 733,123

[22] Filed: May 10, 1985

Related U.S. Application Data

[62] Division of Ser. No. 565,618, Dec. 27, 1983, Pat. No. 4,563,070.

[30] Foreign Application Priority Data

Dec. 28, 1982 [JP] Japan ................................. 57-230077

[51] Int. Cl.$^4$ ...................... G03B 7/085; H04N 5/238
[52] U.S. Cl. .................................... 358/228; 354/416; 354/423
[58] Field of Search ................ 358/211, 228; 352/141, 352/169; 354/413, 416, 417, 420, 423, 442

[56] References Cited

U.S. PATENT DOCUMENTS

| | | | |
|---|---|---|---|
| 4,037,234 | 7/1977 | Tunekawa et al. ................. | 354/442 |
| 4,118,716 | 10/1978 | Suzuki et al. ........................ | 354/442 |
| 4,300,167 | 11/1981 | Miller et al. ........................ | 352/141 |
| 4,327,978 | 5/1982 | Ishida et al. ........................ | 354/417 |
| 4,366,501 | 12/1982 | Tsunekawa et al. ................ | 354/416 |
| 4,426,142 | 1/1984 | Iuva et al. ........................... | 354/413 |
| 4,509,847 | 4/1985 | Maida et al. ........................ | 354/442 |
| 4,558,368 | 12/1985 | Aoki et al. .......................... | 352/141 |
| 4,563,070 | 1/1986 | Saito et al. .......................... | 354/416 |

Primary Examiner—Russell E. Adams
Attorney, Agent, or Firm—Toren, McGeady & Associates

[57] ABSTRACT

An exposure control apparatus including a diaphragm for controlling the exposure amount on a focal plane, a light metering element for measuring the light passing through an aperture opening of the diaphragm, a servo control circuit for servo controlling the size of the aperture opening by the output of the light metering element, and a signal forming circuit receptive of the output of the light metering element for producing an output signal for controlling the light amount of a flash device.

17 Claims, 2 Drawing Figures

EXPOSURE CONTROL APPARATUS

This is a division of application Ser. No. 565,618, filed Dec. 37, 1983, now U.S. Pat. No. 4,563,070.

BACKGROUND OF THE INVENTION

1. Field of the Invention

This invention relates to exposure control apparatus for video cameras, still cameras and cinecameras, and more particularly to exposure control apparatus for cameras and flash devices in combination. The flash device may be incorporated into the camera, or may be an independent unit attachable to or connectable with the camera.

2. Description of the Prior Art

In the art of video cameras, the luminance signal obtained from the video signals of the image pickup means has been used in operating a servo drive for the diaphragm, or auto-iris has been employed. Such system is proposed in, for example, U.S. Pat. No. 3,652,154.

To make a still picture, however, the auto-iris which controls the diaphragm by the use of a brightness (luminance) signal produced each 1/60 sec. is very slow in response to changes of the brightness of the object being photographed and cannot provide a proper exposure immediately after the release. Also when an exposure is to be made with the use of a flash device, it is impossible to effect a proper flash exposure by the auto-iris.

Also in the case of video equipped with such an auto-iris, when a flash or other artificial illumination is used for shooting, as the conditions of the object to be photographed change, the position of the diaphragm and the gain of the signal processing circuit are caused to change. In this case, if the responsiveness to such changes in the diaphragm position and the gain are very quick, the signal will take a proper level. Since the auto-iris must, however, be moved by a servo system of long time constant adapted to motion picture photography, there is a defect in actual practice when making a flash exposure that the long time constant has an adverse effect with the result that the video signals take an improper level.

SUMMARY OF THE INVENTION

In view of such drawbacks of the prior art technique, it is an object of the present invention to provide an exposure control apparatus capable of substantially increasing the response speed of the diaphragm, while still permitting the use of a flash device in combination therewith.

Another object of the invention is to provide an exposure control apparatus in which a simple structure suffices for both of controls of the flash device and the disphragm.

Still another object of the invention is to provide an exposure control apparatus capable of obtaining a proper exposure level when in artificial light photography using a flash device.

Other objects and features of the invention will become apparent from the following description of the specification and drawings.

DETAILED DESCRIPTION OF THE PREFERRED EMBODIMENTS

Figure 1:
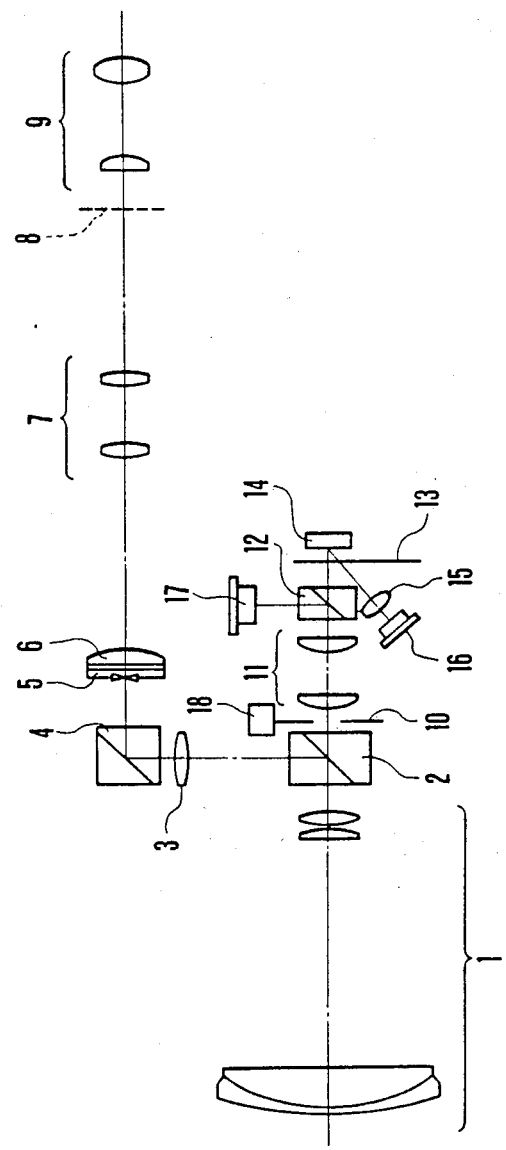
FIG. 1 is a vertical section view of an optical system in a camera to which the present invention is applicable

In FIG. 1 there is shown an optical system in a camera employing one form of the present invention, including a zoom lens 1, a beam splitter 2, an objective lens 3 for a finder, a prism 4, a first image plane 5 on a screen, a condenser lens 6, an erector lens 7, a second image plane 8, an eye-piece 9, diaphragm blades 10 as stop means, an image forming lens 11, a beam splitter 12, shutter blades 13, a CCD image sensor 14 on a focal plane, a collector lens 15, and a photosensitive element 16 such as silicon photo cell (SPC), and a photosensitive element 17. The photosensitive element 16 may be otherwise positioned at the photosensitive element 17, and is arranged to receive the reflected light from the image sensor or CCD 14 when the shutter blades 13 are retracted from the front of CCD 14, and to play a role as light metering means responsive to the illumination on the shutter blades having the same reflectivity as that of the surface of CCD 14 when the shutter blades cover the image sensor or CCD 14. The otherwise arranged photosensitive element 17 is made to operate with that part of the image forming light bundle which is split by the beam splitter 12. The apparatus further includes a potentiometer 18 for sensing the aperture value of the diaphragm blades 10 and for producing an output voltage proportional to the size of aperture opening.

Figure 2:
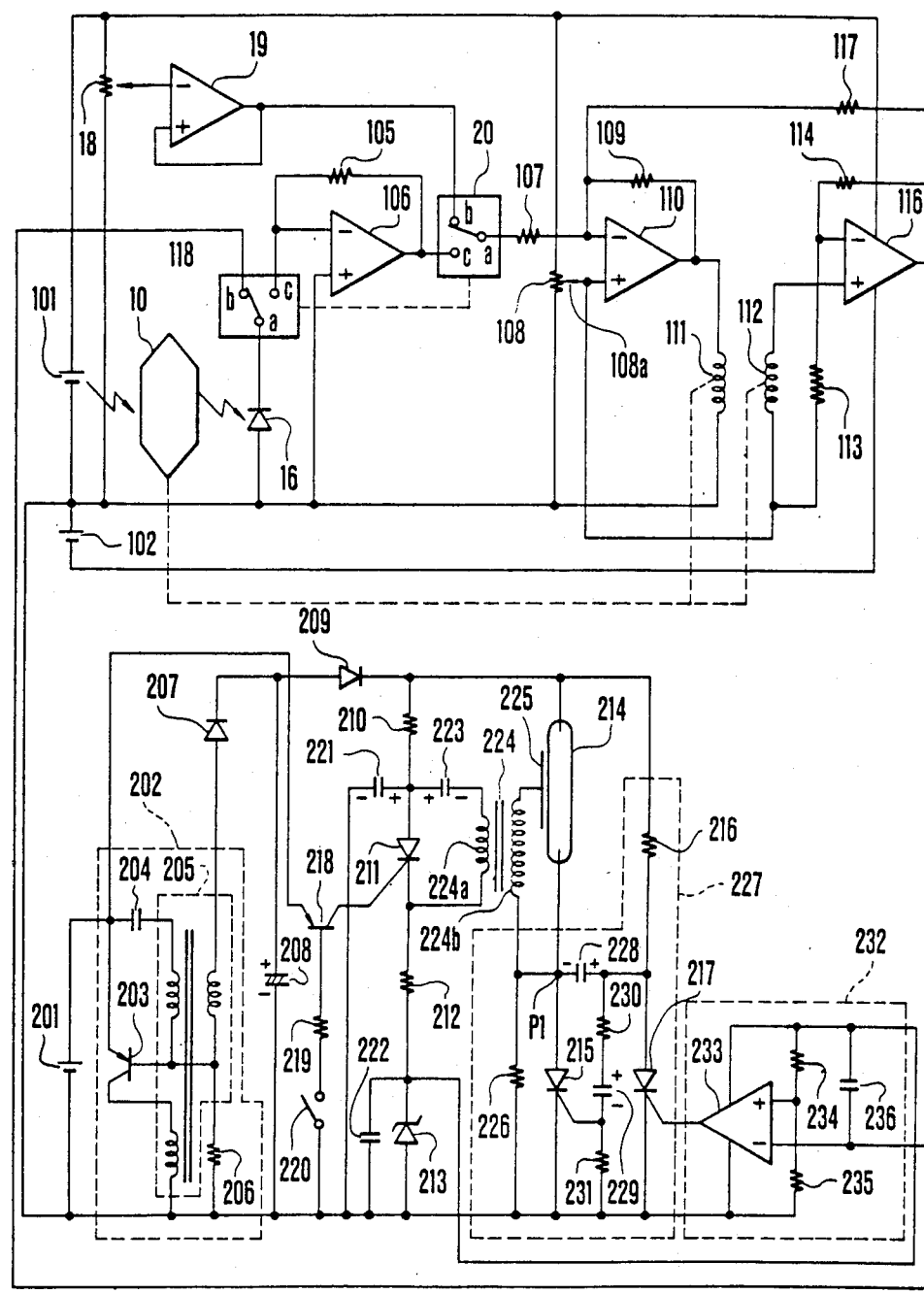
FIG. 2 is an electrical circuit diagram of an embodiment of a diaphragm control circuit and a control circuit of a flash device according to the present invention.

FIG. 2 in a circuit diagram illustrates an embodiment of the present invention. First described is a diaphragm control circuit. 101 and 102 are positive and negative electrical power sources connected in series with each other. Connected in parallel to the series circuit of positive and negative electrical power sources 101 and 102 are operational amplifiers 19, 106, 110 and 116. The inverting input of operational amplifier 16 is connected to the potentiometer 18 as setting means, and its output and its non-inverting input are connected to each other to form a buffer amplifier. The non-inverting input of operational amplifier 106 is connected to a junction point of batteries 101 and 102 (hereinafter called ground point), and its inverting input is connected through series circuit of a switch 118 as changeover means and the photosensitive element 16 to ground point. Connected between the output and the inverting input is a resistor 105. The parts 16, 105 and 106 constitute a photoelectric transducing amplifier known in the art for producing an output voltage proportional to the intensity of light entering through the aperture opening of the diaphragm blades 10 and impinging on the photosensitive element 16. The amplifier 110 as comparing and computing means has a non-inverting input which is connected to a slider of a variable resistor 108 for forming a reference level, the fixed ends of which are connected to the positive terminal of the positive battery 101 and the ground point respectively. The inverting input of operational amplifier 110 is connected through a resistor 107 and a changeover switch 20 to the output of operational amplifier 106 and its output is connected through a coil 111 as diaphragm drive means to the ground point, and at the same time through a resistor 109 to its inverting input. The coil 111 closes the diaphragm when a negative voltage from the output of operational amplifier 110 is applied thereto, and the diaphragm is opened when a positive voltage is applied.

The non-inverting input of operational amplifier 116 is connected through a brake coil 112 of the diaphragm to the non-inverting input of operational amplifier 110, and its inverting input is connected through a resistor 113 to the non-inverting input of operational amplifier 110, and at the same time through a resistor 114 to its output. Further, the output of operational amplifier 116 is connected through a resistor 117 to the inverting input of operational amplifier 110.

Exerted in the brake coil 112 is a negative electromotive force when the diaphragm is closing, and a positive electromotive force when it is opening. In such a way a control means for servo controlling the diaphragm is constructed by the operational amplifiers 110 and 116 and others.

For note, the changeover switch 20 has two switched positions "b" and "c" with a movable contact, "a", and is arranged to take its "b" position when a flash exposure is made, and its "c" position when a daylight exposure is made.

Next described is the circuitry of the flash device having the common ground point with the aforesaid diaphragm control circuit. An electrical power source or battery 201 is connected to an osicllation booster circuit 202 which includes a transistor 203, a capacitor 204, an oscialltion transformer 205 and a resistor 206. The output of boosting circuit 202 is connected through a diode 207 to a main capacitor 208. Both of the poles of main capacitor 208 are connected through a diode 209 across a series circuit of a resistor 210, a trigger thyristor 211, a resistor 212 and a constant voltage diode 213, across another series circuit of a flash discharge tube 214 and a main thyristor 215 and across another series circuit of a resistor 216 and a commutation thyristor 217. Connected between the positive terminal of battery 201 and the gate of trigger thyristor 211 is an emitter-collector path of a transistor 218 for control of the trigger thyristor. Connected between the base of transistor 218 and the negative terminal of battery 201 is a series circuit of a resistor 219 and a synchronizing terminal 220.

In parallel with the series circuit of trigger thyristor 211, resistor 212 and constant voltage diode 213 is connected a capacitor 221 for causing the constant voltage diode 213 to produce a constant voltage for a predetermined time. Connected in parallel to the constant voltage diode 213 is a capacitor 222. Connected in parallel to trigger thyristor 211 is a series circuit of a trigger capacitor 223 and a primary winding 224a of the trigger transformer. A secondary winding of trigger transformer 224 is connected at its one end to a trigger electrode 225 of flash discharge tube 214 and at its opposite end to a conjunction point P1 of flash discharge tube 214 and main thyristor 215 and also to a resistor 226.

The main thyristor 215 is used as the series control switching element and constitutes a light amount control circuit 227 together with the main thyristor 215 and commutation thyristor 217. 228 is a commutation capacitor; 229 is a capacitor; and 230 and 231 are resitors. The gate of commutation thyristor 217 is connected to the output of a light metering circuit 232 as signal output means. The light metering circuit is formed with a comparator 233, resistors 234 and 235, a capacitor 236 as integrating means and the photosensitive element 16 which is in common use with the diaphragm control circuit. The light amount control circuit 227 and the light metering circuit 232 constitute a flash exposure control circuit.

For note, the changeover switch 118 connected in series with the photosensitive element 16 has, similarly to the switch 20, its "b" position for flash photography and its "c" position for daylight or stationary photography.

The operation

When a daylight exposure is to be made, the switches 20 and 118 are in their "a-c" positions. Upon throwing a power switch (not shown), a voltage proportional to the intensity of light passing through the diaphragm 10 and impinging on the photosensitive element 16 is produced at the output of operational amplifier 106.

Assuming that the intensity of incident light is so high that the output voltage of operational amplifier 106 rises above the reference level at the non-inverting input of operational amplifier 110, then a negative voltage is produced at the output of operational amplifier 110. This voltage is applied to the drive coil 111, thereby the diaphragm is closed down with decrease in the intensity of light incident upon the photosensitive element 16. As the diaphragm is moving in a direction to close the size of aperture opening a negative electromotive force is exerted in the brake coil 112 as has been mentioned above, and is applied to the non-inverting input of operational amplifier 116. The operational amplifier 116 amplifies this in the non-inverting direction and produces a negative output voltage which is then applied through resistor 117 to the inverting input of operational amplifier 110. The operational amplifier 110 inverts this negative voltage and produces an output in the form of a positive voltage component. The voltage appearing at the output of operational amplifier 110 curing movement of the diaphragm is equal to the sum of the negative voltage given by the output of the operational amplifier 106 and the positive voltage given by the operational amplifier 116, so that the driving voltage for the drive coil 111 is cancelled by the electromotive force exerted in the brake coil 112, and an overcontrol of the diaphragm is prevented.

Conversely, when the output voltage of operational amplifier 106 is lower than the reference level at the slider of the variable resistor 108, or the non-inverting input of operational amplifier 110, a positive voltage is produced at the output of operational amplifier 110 and is applied to drive coil 111, thereby the diaphragm is driven to open. However, as the diaphragm is opened, a positive electromotive force is generated in the brake coil 112, and after having been amplified by operational amplifier 116 is applied to operational amplifier 110. Thereby the output of operational amplifier 110, or the driving voltage of drive coil 111 is reduced to prevent over-running of the diaphragm. This effect is the same as when the diaphragm is closed.

It is to be understood from the foregoing that when the intensity of incident light is high, the diaphragm is closed, and when it is low, the diaphragm is opened, so that the illumination on the photosensitive element is maintained constant.

Further even after the light intensity on the photosensitive element has reached a prescribed value, as the ambient light changes in intensity with time, the aperture value of the diaphragm is correspondingly changed, leaving the light amount to the photosensitive element 16 unchanged. In other words, since the photosensitive element 16 is arranged inside the diaphragm, the aperture value is servo controlled in accordance with the intensity of incident light.

The foregoing has been described in connection with the exposure control operation besides flash photography.

Next, when a flash exposure is to be made, the switches are moved to their "a-b" positions in response to closure of a power switch (not shown) of the flash device or to completion of charging of the storage capacitor 208 of the flash device. A voltage representing the aperture value from the potentiometer 18 is applied to the operational amplifier 19 as the buffer amplifier and through resistor 107 to the non-inverting input terminal of operational amplifier 110.

Therefore, the diaphragm is controlled at a prescribed aperture value so as to make the input voltages of the inverting and non-inverting input terminals of operational amplifier 110 equal to each other.

On the other hand, such closure of the power switch of the flash device also causes actuation of oscillation booster circuit 202. Then through diode 207 is charged the main capacitor 208, and also through diode 209 are charged the capacitor 221, trigger capacitor 223, commutation capacitor 228 and capacitor 229.

At a time when the voltage on the main capacitor 208 reaches a satisfactory level for firing, the synchronizing contact 220 turns on. Then transistor 218 turns on. Then thyristor 211 turns on to discharge the charge on trigger capacitor 223 through the primary winding 224a of trigger transformer 224, causing a high voltage to be produced in the secondary winding 224b. Thereby flash discharge tube 214 is triggered, and current is allowed to flow to the gate of main thyristor 215 through commutation capacitor 228, resistor 230 and capacitor 229. Therefore, the main thyristor 215 is turned on to initiate firing of the flash discharge tube 214. At the same time, the charge on capacitor 221 is discharged through trigger thyristor 211 and resistor 212 to the paralle circuit of constant voltage diode 213 and capacitor 222, causing a constant voltage to appear across the two ends of diode 213 for a predetermined time (a few milliseconds to several tens of ms.). This constant voltage is given as an electrical power source voltage to the light metering circuit 232.

As the object to be photographed is illuminated with flash of light emitted from the energized flash discharge tube 214, the reflected light is received by the photosensitive element 16. A photo-current corresponding to the intensity of incident light charges the integration capacitor 236. As the voltage stored on the integration capacitor 236 increases, when the potential at the junction point of integration capacitor 236 and photosensitive element 16 is lowered below the potential at the junction point of resistors 234 and 235 (which is previously determined depending upon the sensitivity of the used photosensitive material of image pick-up device and the aperture value of the lens), comparator 233 changes its output from low to high level at which commutation thyristor 217 is turned on. Therefore, the discharge current of commutation capacitor 228 reverse-biases the main thyristor 215, thereby the main thyristor 215 is turned off. Therefore, discharge current from the storage capacitor 208 through the discharge tube 214 is cut off. Thus firing of the flash discharge tube 214 is terminated.

It will be appreciated that the photosensitive element 16 can be used not only as part of the firing control circuit of the flash device but also as part of the servo control of the diaphragm, and that by changing over between the output of the potentiometer which represents the aperture value and the output of the photosensitive element 16, the size of aperture opening of the diaphragm when in the flash exposure can be adjusted to the light value.

Though the foregoing embodiment has been described in connection with the still video camera using the solid state image pickup device, it is of course possible to apply the invention to ordinary cameras using silver halide photosensitive material.

Thus, according to the present invention, the intensity of light passed through the aperture opening of the diaphragm is measured without recourse to the image pickup means but by light metering means, and its output is used in driving the servo motor of the diaphragm with an advantage that the diaphragm movement can rapidly follow up the change of the object brightness. Another advantage is that the output of the aforesaid light metering means is also used in controlling the firing time of the flash device so that the system can be constructed in a simple form. Further, when in flash photography, the size of aperture opening of the diaphragm is adjusted to a prescribed value, a proper exposure value can be derived.

What we claim is:

1. An image pick-up apparatus, comprising:
   (a) image receiving means for pick-up an image of an object;
   (b) light metering means for detecting the brightness of the object;
   (c) illumination means for illuminating the object;
   (d) restriction means for restricting the amount of light incidence on the image pick-up means; and
   (e) changeover means for using an output of the light metering means selectively for the illumination means or the restriction means.

2. An image pick-up apparatus according to claim 1, in which the image pick-up means includes means for converting the image into an electric signal.

3. An image pick-up apparatus according to claim 1, in which the image pick-up means includes means for recording the image.

4. An image pick-up apparatus according to claim 1, in which the light metering means includes light receiving means.

5. An image pick-up apparatus according to claim 4, in which the light receiving means includes an SPC.

6. An image pick-up apparatus according to claim 1, in which the illumination means includes flash firing means.

7. An image pick-up apparatus according to claim 6, in which the flash firing means includes means for stopping the flash firing with a predetermined timing.

8. An image pick-up apparatus according to claim 1, in which the restriction means includes a diaphragm.

9. An image pick-up apparatus according to claim 1, in which the changeover means includes a switch.

10. An image pick-up apparatus according to claim 1, which further comprises:
    means for controlling the operations of the restriction means and the illumination means by using an output of the light metering means selectively for the restriction means or the illumination means.

11. An image pick-up apparatus according to claim 10, in which the control means is arranged to control the restriction of the amount of light incidence by the restriction means.

12. An image pick-up apparatus accoring to claim 10, in which the control means are arranged for controlling the illumination amount of the object by the illumination means.

13. An image pick-up apparatus, comprising:
   (a) image pick-up means for pick-up an image of an object;
   (b) detection means for detecting the brightness of the object;
   (c) changeover means;
   (d) first means for controlling the amount of light incident on the image pick-up means in correspondence to an output of the detection means when the changeover means is in a first state; and
   (e) a second means for controlling the amount of illumination on the object in correspondence to an output of the detection means when the changeover means is in a second state, said second means including flash means.

14. An image pick-up apparatus according to claim 13, in which the image pick-up means includes means for converting the image into an electric signal.

15. An image pick-up apparatus according to claim 13, in which the image pick-up means includes means for recording the image.

16. An image pick-up apparatus according to claim 13, in which the detection means includes light receiving means.

17. An image pick-up apparatus according to claim 13, in which the first means includes a diaphragm.

* * * * *